July 13, 1926.
J. F. CULLEN ET AL
1,592,757
PROCESS OF EXTRACTING POTASSIUM AND PHOSPHOROUS FROM ROCKS
Filed May 6, 1921
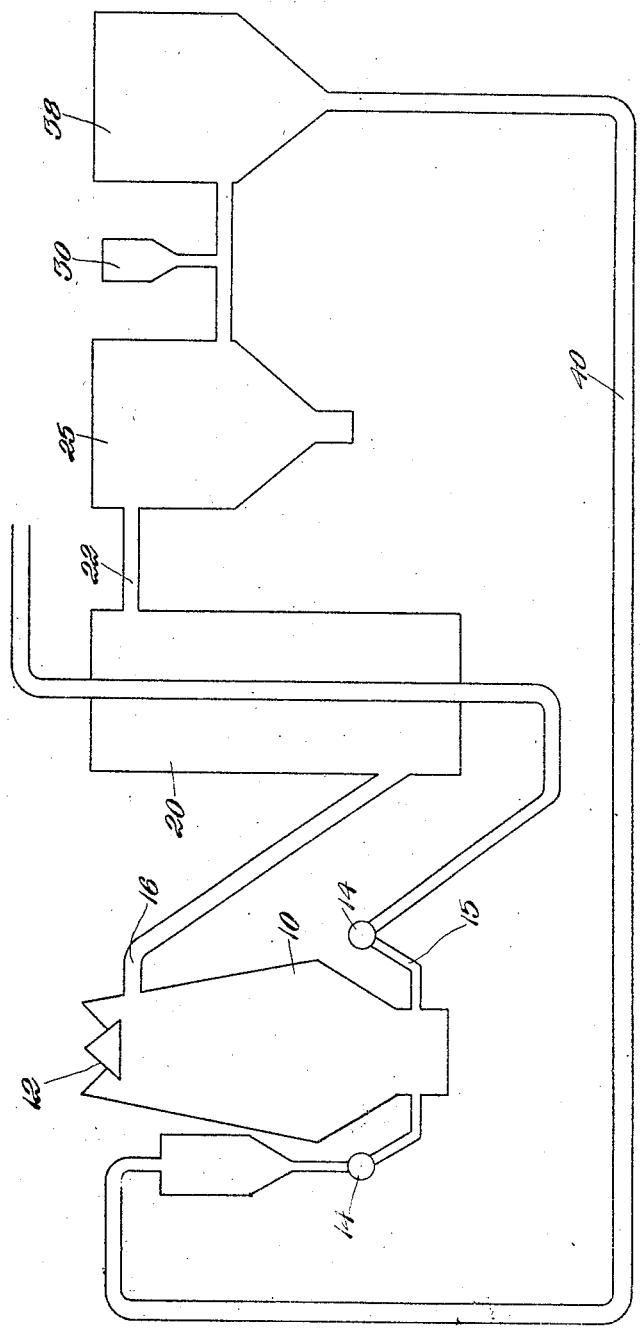
Witness:
Alfred H. McGlinchey
Inventors
Joseph F. Cullen and
Thomas C. Harper Patented July 13, 1926.

1,592,757

UNITED STATES PATENT OFFICE.

JOSEPH F. CULLEN AND THOMAS E. HARPER, OF MIDVALE, UTAH, ASSIGNORS TO UNITED STATES SMELTING REFINING & MINING COMPANY, A CORPORATION OF MAINE.

PROCESS OF EXTRACTING POTASSIUM AND PHOSPHORUS FROM ROCKS.

Application filed May 6, 1921. Serial No. 467,325.

This invention relates to the process of extracting potassium and phosphorus from rocks.

Potash bearing rocks are in general of a silicious nature, containing the potassium in the form of silicate together with silicates and oxides of other metals. These potash bearing rocks occur in vast deposits in various sections, for example large deposits of a rock known as wyomingite, and madupite are to be found in the State of Wyoming. Other forms of potash bearing rock include the various feldspars which occur in large quantities in many parts of the United States. Phosphorus bearing rocks contain the phosphorus chiefly in the form of calcium phosphate with which other impurities are usually associated. These phosphorus bearing rocks also occur in large quantities in the western part of the United States.

The object of the present invention is to provide a process of extracting potassium and phosphorus from potash and phosphorus bearing rocks in an advantageous and novel manner, so that the potassium and phosphorus may be recovered in a form suitable for use in fertilizer and other manufactures.

To this end, the invention consists in the process hereinafter described and claimed.

The drawing illustrates diagrammatically the system by which the process is preferably carried out.

The process contemplates, in general, the smelting of the potash bearing and the phosphate bearing rocks to cause the volatilization of both the potassium and phosphorus contained therein. After the volatilization, the gases containing the volatilized potassium and phosphorus are subjected to suitable treatment to recover the potassium and phosphorus in the form desired. In the preferred application of the process the gases are subjected to treatment such that the potassium and phosphorus are recovered in the form of a potassium phosphate suitable for use in fertilizer and other manufactures.

For purposes of illustration, the invention will be described in detail as applied to a process of extraction of potassium and phosphorus from wyomingite and phosphate rock, and the recovery of the same in the form of potassium phosphate. The wyomingite and the phosphate rock are first broken or crushed to substantially one to three inch size. The crushed rock is charged into a furnace 10 through a hopper 12, together with coke in amount approximately 40% of their combined weights. The furnace 10 may be of any desired type or construction and will preferably comprise a shaft furnace provided with a closed top of bell and hopper design such as is well known and commonly employed in metallurgical work. The furnace is preferably provided with the usual tuyères 14 through which the air blast is introduced into the charge. The gases leave the furnace through the outlet pipe 16 leading from the top thereof.

The smelting of the wyomingite and the phosphate rock is conducted under conditions such as to cause volatilization of the potassium and phosphorus in the rocks. In order that the phosphorus may be volatilized the calcium phosphate of the phosphate rock is preferably reduced to a form capable of volatilization by the maintenance of strong reducing conditions within the furnace and under conditions such as to produce a fluid slag.

In practice it is thought that the reduction is carried to a point at which elementary phosphorus is formed. In order to assist in the volatilization of the potassium from the potash rock, a volatilizing agent is employed, comprising preferably a salt of either an alkali or an alkaline earth metal, as for example calcium chloride. The volatilizing agent is preferably injected into the charge at the fusion zone of the furnace and this may be conveniently accomplished by pneumatically injecting a stream of the powdered salt, as for example calcium chloride, into the tuyères 14 or the tuyère bustle pipe 15 from which it is carried with the main air blast into the charge. The salt combines with the fused potassium silicate of the potash rock to form a potassium salt which is volatilized and passes out through the outlet pipe 16 along with the volatilized phosphorus or phosphorus compounds and the usual furnace gases, containing the combustion products of the smelting operation. Silica and the alumina of the potash rock and the lime of the phosphate rock serve as mutual fluxes, and result in the formation of a readily fusible slag which is tapped from the furnace at regular intervals. The smelting operation also forms a relatively small amount of an alloy of iron and phosphorus, which is also tapped from the furnace at suitable intervals and cast into bars. This alloy constitutes a valuable by-product of the process, having important uses in the manufacture of steel and many alloys.

In order to recover the volatilized potassium and phosphorus in the form of a potassium phosphate, the furnace gases containing carbon monoxide and the volatilized potassium salt and the phosphorus are conducted from the top of the furnace through the outlet pipe 16 to a stove 20 in which they are burned. The heat generated by the combustion of the gases within the stove 20 is utilized to pre-heat the main air blast leading to the tuyères, as is diagrammatically illustrated in the drawing. The preheating operation also serves to cool the furnace gases, preferably to the neighborhood of 300° C. The combustion of the gases within the stove operates to oxidize the volatilized phosphorus to the form of phosphoric acid, which combines with the potassium salt to form a fume of a potassium phosphate and free gaseous hydrochloric acid.

The next step in the process comprises the recovery of the potassium and phosphorus from the furnace gases. For this purpose the gases are subjected to treatment by a separating apparatus in order to remove the desired compound or compounds therefrom. If the phosphorus has been oxidized in the stove 20, so that potassium and phosphorus are in the form of potassium phosphate, the gases are led from the stove 20 through the pipe 22 to the separating apparatus 25. This separating apparatus 25 may comprise an electrostatic dust separator of the well known Cottrell type or may comprise the well known bag house for the filtration of the furnace gases. The construction and mode of operation of such apparatus is well-known, and for this reason detail illustration and description is omitted. As the furnace gases pass through the separating apparatus 25, the potassium phosphate is separated therefrom, and recovered in a form suitable for use in the manufacture of fertilizer and other materials.

The furnace gases leaving the separator 25 contain a considerable quantity of the acid of the salt employed in the smelting operation as the volatilizing agent and originally introduced into the charge through the tuyères. It is desirable that this acid should be recovered and for this purpose the furnace gases leaving the separator 25 are subjected to treatment with an alkali, preferably lime, for the formation of a salt capable of being used as a volatilizing agent in subsequent operations of the process. For this purpose the gases are led from the separator 25 through a receptacle containing powdered lime or through suitable scrubbing towers containing milk of lime, as diagrammatically indicated at 30. In the event that the furnace gases are treated with powdered lime, it may be necessary to separate the calcium salt thus formed, from the furnace gases by means of a second separating apparatus 38. This separating apparatus 38 will preferably comprise either an electro-static separator or a bag house. The calcium salt thus obtained is returned to the furnace by a conveying system diagrammatically illustrated by the conduit 40 and is preferably again blown into the charge through the tuyères 14. It is to be observed, therefore, that the process may be operated continuously and that during the continuous operation of the process the volatilizing agent is regenerated and may be used again. Any loss or deficiency in the quantity of the volatilizing agent thus regenerated is compensated for by additional quantities of a suitable salt, as for example sodium chloride, introduced through the tuyères. When calcium chloride is employed as the volatilizing agent in the smelting operation and is regenerated by treatment of the furnace gases with lime in the manner just described, the handling of the calcium chloride and the conveying of the same to return it again to the furnace will preferably be accomplished in a closed conveying system.

If found desirable oxidation of the phosphorus may be accomplished by mixing a small volume of air with the furnace gases as they issue from the furnace, also the phosphorus, potassium and chlorine compounds may with advantage be separated from the furnace gases before the latter are burned in the stove to preheat the air blast.

In the operation of the present process upon the usual grades of wyomingite containing about 10% potash and upon phosphate rock containing about 30% of phosphoric acid, the charge to the furnace will preferably comprise about two parts of wyomingite to one part of phosphate rock. The potassium phosphate recovered by the operation of the process approaches the mono-potassium phosphate ($KH_2PO_4$) in composition. The exact composition of the potassium phosphate may be varied by control of the proportions of phosphate rock and potash rock in the furnace charge. For example, by increasing the ratio of phosphate to potash rock, free phosphoric acid may be produced as well as potassium phosphate.

A small quantity of free phosphoric acid establishes the best electrical conditions for the operation of the treater and also assists subsequently in the conversion to monopotassium phosphate of any metaphosphate formed. In general, however, the proportion of two to one as above given will be found preferable for the production of a readily fusible slag and a potassium phosphate suitable for use in fertilizer and other manufactures.

Some potassium bearing silicate rock and some phosphate rock contain chlorine and fluorine as natural constituents. The presence of these elements materially assists in the volatilization of the potassium so that in some instances smaller quantities of volatilizing agents may be required than in other instances, depending entirely upon the character and composition of the potash and phosphate rock. The use of a volatilizing agent in excess of the amount needed to insure commercially satisfactory extraction of the potassium has, however, no serious disadvantage since it is for the most part subsequently regenerated and returned to the process.

While the preferred application of the invention has been described as applied to a process for the recovery of the potassium and phosphorus in the form of a potassium phosphate, it will be understood that the invention contemplates the recovery of both the potassium and phosphorus in other forms. Furthermore, while it is preferred to smelt the rocks in a blast furnace, reverberatory and other types of furnaces may be used if found desirable.

Having thus described the invention, what is claimed is:

1. The process of extracting potassium and phosphorus from potassium bearing and phosphorus bearing rocks which consists in volatilizing the potassium and the phosphorus compounds by smelting of the rocks under reducing conditions and thereafter recovering the potassium and the phosphorus compounds from the gases produced by the smelting operation.

2. The process of extracting potassium and phosphorus from potassium bearing and phosphorus bearing rocks which consists in volatilizing the potassium and the phosphorus compounds by the smelting of the rocks under reducing conditions, treating the gases produced by the smelting operation to cause the formation of a compound of phosphorus and potassium, and thereafter recovering such compound from the gases.

3. The process of extracting potassium and phosphorus from potassium bearing and phosphorus rocks which consists in volatilizing the potassium and phosphorus compounds from the rocks by smelting under reducing conditions, oxidizing the gases to form potassium phosphate, and recovering the potassium phosphate.

4. The process of extracting potassium and phosphorus from potassium bearing and phosphorus bearing rocks which consists in the volatilization of the potassium and phosphorus compounds by smelting of the rocks under reducing conditions in the presence of a volatilizing agent, and thereafter treating the furnace gases to recover the potassium and phosphorus compounds.

5. The process of extracting potassium and phosphorus from potassium bearing and phosphorus bearing rocks which consists in the volatilization of the potassium and the phosphorus compounds by the smelting of the rocks under reducing conditions and in the presence of a salt, and thereafter treating the furnace gases to recover a compound of potassium and phosphorus therefrom.

6. The process of extracting potassium and phosphorus from potassium bearing and phosphorus bearing rocks which consists in the volatilization of the potassium and the phosphorus compounds by smelting the rocks under reducing conditions and in the presence of a volatilizing agent, and thereafter treating the furnace gases to recover a compound of potassium and phosphorus therefrom.

7. The process of extracting potassium from potassium bearing rocks which consists in smelting such rocks in a furnace, introducing a volatilizing agent into the charge at the fusion zone of the furnace during the smelting operation to cause volatilization of a potassium salt therefrom, and thereafter treating the furnace gases to remove such salt.

8. The process of extracting potassium and phosphorus from potassium bearing and phosphorus bearing rocks which consists in volatilization of the potassium and phosphorus compounds by smelting the rocks in the presence of a volatilizing agent, and thereafter recovering such volatilizing agent from the furnace gases.

9. The process of extracting potassium and phosphorus from potassium bearing and phosphorus bearing rocks which consists in volatilizing the potassium and phosphorus compounds by smelting such rocks in a furnace under reducing conditions, and introducing a volatilizing agent into the charge at the fusion zone of the furnace during the smelting operation to cause volatilization of the potassium compound, and thereafter treating the furnace gases to recover a compound of potassium and phosphorus therefrom.

10. The process of extracting potassium and phosphorus from potassium bearing and phosphorus bearing rocks which consists in volatilizing the potassium and phosphorous compound by smelting such rocks in a furnace under reducing conditions and in the presence of a volatilizing agent to cause the volatilization of the potassium compound and passing furnace gases through a separating apparatus for the recovery of a compound of potassium and phosphorus therefrom.

11. The process of extracting potassium and phosphorus from potassium bearing and phosphorus bearing rocks which consists in smelting such rocks in a furnace under reducing conditions, introducing a volatilizing agent into the charge at the fusion zone of the furnace during the smelting operation, passing the furnace gases through a separating apparatus for the recovery of the compound of potassium and phosphorus therefrom, and treating the furnace gases to regenerate a volatilizing agent.

12. The process of extracting potassium and phosphorus from potassium bearing and phosphorus bearing rocks which consists in smelting such rocks in a furnace under reducing conditions, introducing a volatilizing agent into the charge at the fusion zone of the furnace during the smelting operation, passing the furnace gases through a separating apparatus for the recovery of the compound of potassium and phosphorus therefrom, treating the furnace gases to regenerate the volatilizing agent, and thereafter returning the regenerated volatilizing agent to the furnace to be injected into the charge.

13. The process of extracting potassium and phosphorus from potassium bearing and phosphorus bearing rocks which consists in smelting such rocks in a furnace under reducing conditions, introducing a chloride into the charge at the fusion zone of the furnace during the smelting operation to cause volatilization of the potassium as potassium chloride, oxidizing the furnace gases to cause formation of potassium phosphate, passing the furnace gases through a separating apparatus for the recovery of the potassium phosphate, treating the furnace gases with an alkali to regenerate a chloride salt, and returning said salt to the furnace to be injected into the charge.

JOSEPH F. CULLEN.
THOMAS E. HARPER.